United States Patent
Sugahara et al.

(10) Patent No.: US 6,778,210 B1
(45) Date of Patent: Aug. 17, 2004

(54) IMAGE PICKUP APPARATUS WITH BLUR COMPENSATION

(75) Inventors: Takuro Sugahara, Kokubunji (JP); Hideaki Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 738 days.

(21) Appl. No.: 09/617,296

(22) Filed: Jul. 14, 2000

(30) Foreign Application Priority Data

Jul. 15, 1999 (JP) .......................................... 11-201350

(51) Int. Cl.[7] ........................ H04N 5/228; H04N 5/235
(52) U.S. Cl. .................... 348/208.4; 348/229.1
(58) Field of Search ..................... 348/208.4, 208.12, 348/208.13, 208.16, 221.1, 229.1, 230.1, 362, 296, 297; 396/52, 54, 55

(56) References Cited

U.S. PATENT DOCUMENTS

| | | | | |
|---|---|---|---|---|
| 4,819,075 A | * | 4/1989 | Imaide et al. ............... | 348/297 |
| 4,825,291 A | * | 4/1989 | Mimura et al. ........... | 348/220.1 |
| 5,420,635 A | * | 5/1995 | Konishi et al. ............. | 348/362 |
| 6,122,004 A | * | 9/2000 | Hwang .................. | 348/208.13 |
| 6,542,202 B2 | * | 4/2003 | Takeda et al. .............. | 348/648 |
| 2003/0133035 A1 | * | 7/2003 | Hatano ....................... | 348/362 |

FOREIGN PATENT DOCUMENTS

JP          10-191136          7/1998

* cited by examiner

Primary Examiner—Andrew Christensen
Assistant Examiner—Tia M. Harris
(74) Attorney, Agent, or Firm—Westerman, Hattori, Daniels & Adrian, LLP

(57) ABSTRACT

An image pickup apparatus including: CCD image pickup device; a preprocess circuit for generating image signals based on output of the image pickup device; a CCD driver for controlling charge accumulation time at the image pickup device; a pickup image generating section for generating one pickup image signal by means of addition of a plurality of image signals obtained by rendering a plurality of times of consecutive exposure by controlling the CCD driver; a blur correcting section for, in generation of the pickup image, adding a plurality of image signals after compensated for relative motion among said plurality of image signals; and an image blur detecting section for detecting relative motion information among the plurality of image signals on the basis of said plurality of image signals, wherein compensation processing at the blur correcting section is performed on the detection result at the image blur detecting section.

14 Claims, 2 Drawing Sheets

IMAGE PICKUP APPARATUS WITH BLUR COMPENSATION

This application claims benefit of Japanese Application No. Hei 11-201350 filed in Japan on Jul. 15, 1999, the contents of which are incorporated by this reference.

BACKGROUND OF THE INVENTION

The present invention relates to image pickup apparatus, and more particularly relates to an image pickup apparatus having a static image taking function capable of effectively suppressing blur in the image for example due to camera shake.

It is known in taking a static image with an image pickup apparatus that camera shake or motion of an object causes a blur in the image if the shooting takes a relative long time period. Such "blur" in image is also referred to sometimes as "out of focus", since the image is one-dimensionally (including curves) out of focus. In the present specification, however, it will be described as "blur". Although an image blur at times is actively applied in such photographing techniques as panning, it is usually regarded as a degradation of image quality and prevention of this is a must. A typical method for such prevention is to stabilize the camera for example by using a tripod. In another method, a short-time exposure (high-speed shutter) is used. Both, however, are conditionally used and impossible to be applied when the image is to be taken by a hand-held camera in a poorly lighted condition.

A technique as that applicable even to such case has been disclosed in Japanese patent application laid open No. 10-336510. In particular, a motion in object images relative to the imaging surface is previously detected and, on the basis of such information, an optical system (or an imaging block if considered as consisting of an "optical system+ image pickup device") for shifting a formed image is driven when taking images so as to stop object images relative to the imaging surface. Also disclosed in the same laid-open application as known prior art are "camera shake correction control means" especially for dynamic images. Those mentioned as the correction means include an optical type (using an optical system for shifting a formed image in the above described manner) and an electronic type (shifting an image frame to be extracted from the total imageable area by means of memory and driving of image pickup device). Further those mentioned as "method of detecting camera shake" include: motion vector detection for detecting the amount and direction of shift of objects by means of image processing; and angular velocity detection for directly detecting the swing of the camera body by an angular velocity sensor.

As pointed out in the same laid-open application, however, the conventional camera shake correction technique for dynamic images is incapable of eliminating image blur in one frame of image when it takes a relatively long time period in taking a static image. In respect of the technique as disclosed in the same laid-open application, it has the following two problems:
(i) Since a special optical system (imaging block) is necessary to shift a formed image, the size/dissipation-power/ cost of the apparatus is increased and its image forming performance is degraded due to the use of the special optical system.
(ii) Since correction is performed on the basis of information obtained before the taking of image, the correction becomes erroneous and the image quality gets all the worse if the motion of image has been changed.

SUMMARY OF THE INVENTION

To solve the above described two problems in the prior art, it is an object of the present invention to provide an image pickup apparatus having a static image taking function capable of an effective blur correction applicable even to a long-time image taking, without requiring a special imaging block for shifting a formed image in correcting blur, without causing an increase in size/dissipation-power/cost/ etc., and deterioration in image forming performance of the apparatus, and furthermore with a capability without requiring a separate sensor of accurate blur correction free from a possibility of erroneous correction even when the motion of image has been changed.

In accordance with a first aspect of the invention, there is provided an image pickup apparatus including: an image pickup device; image signal generation means for generating image signals based on output of the image pickup device; accumulation time control means for controlling charge accumulation time at the image pickup device; pickup image generation means for generating one pickup image signal by adding together a plurality of image signals obtained by rendering a plurality of consecutive exposures by controlling the accumulation time control means; motion information detection means for detecting relative motion information among the plurality of image signals based on the plurality of image signals; and motion compensation means for compensating relative motion among the plurality of image signals based on the detection result at the motion information detection means. The pickup image generation means adds together the plurality of image signals subjected to motion compensation processing at the motion compensation means.

In thus constructed image pickup apparatus, since, in generating a pickup image signal, the plurality of image signals are added together after compensated for relative motion among the plurality of image signals, a special imaging block for shifting a formed image is not required in correcting blur, and an increase in size/dissipation-power/ cost/etc., and deterioration in the image forming performance of the apparatus are not caused. Further, since motion information for use in motion compensation is detected on the basis of the plurality of image signals themselves to be added together, a separate sensor is not required and an accurate blur correction is possible free from a possibility of erroneous correction even when the motion of image has been changed. Furthermore, a high-quality, long-time exposure image taking becomes possible with reducing fixed pattern noise. The above object is thereby accomplished.

In accordance with a second aspect of the invention, there is provided an image pickup apparatus capable of obtaining image signals of a plurality of consecutive frames with respect to one image object, including: setting means for setting charge accumulation time per one frame by dividing a set exposure time into a plurality of portions; motion information detection means for detecting relative motion information among the image signals each obtained in the charge accumulation time per one frame; operation means for operating the respective image signals so as to achieve an agreement in object images of the plurality of frames on the basis of output from the motion information detection means; and image generation means for generating one pickup image signal by adding together the plurality of image signals based on the result of the operation.

In accordance with a third aspect of the invention, there is provided an image pickup apparatus capable of obtaining image signals of a plurality of consecutive frames with respect to one image object, including: determination means for determining whether or not a set exposure time is longer than a camera shake limit exposure time; setting means for, if determined as longer than the camera shake limit exposure time, setting the exposure time to a charge accumulation time by which image signals of a plurality of consecutive frames can be obtained; blur detection means for detecting relative amount of blur among image signals respectively for the plurality of consecutive frames obtained with respect to one image object; operation means for mathematically operating vectors concerning the object image between the respective image signals among the plurality of consecutive frames on the basis of the detected blur amount and for mathematically operating amount of shift and direction thereof of the respective image signals so as to achieve an agreement of the vectors; and image generation means for generating one pickup image signal by adding together the plurality of image signals based on the operation result.

In the second or third aspect of the invention constructed as the above, too, a special imaging block for shifting a formed image is not required in correcting blur, and an increase in size/dissipation-power/cost/etc., and deterioration in image forming performance of the apparatus are not caused. Further, a separate sensor is not required and an accurate blur correction is possible free from erroneous correction even when the motion of image has been changed. The above object is likewise accomplished.

The image pickup apparatus according to the first aspect preferably includes blur corrected static image taking control means for, if an exposure time longer than a predetermined value is set, dividing the exposure time into a plurality of exposure periods each shorter than the predetermined value and for setting each of the divided exposure periods respectively as the exposure time of each of the plurality of consecutive exposures. By providing thus constructed blur corrected static image taking control means, the blur correcting function in the image pickup apparatus according to the first aspect can be applied very simply and automatically.

Further, in the image pickup apparatus according to the first aspect, the plurality of consecutive exposures by the blur corrected static image taking control means are preferably performed as equally divided into the least times of exposure on condition that the exposure period of each exposure satisfies the limiting conditions as described above. A higher image taking S/N ratio is thereby achieved at each time and processing concerning detection of motion information becomes simpler and securer.

Furthermore, in the image pickup apparatus according to the first aspect, the predetermined value of exposure time at the blur corrected static image taking control means is preferably set to a camera shake limit exposure time which is determined by the focal length of taking lens and the size of imaging frame. It is thereby possible to apply blur correction under secure conditions backed by the long-standing empirical laws. It is hence always possible even with a zoom camera, etc., to obtain an image without blur under optimum conditions.

Moreover, the image pickup apparatus according to the first aspect preferably includes mode setting means for selectively setting to a first image taking mode where the motion compensation means is caused to function or to a second image taking mode where the same is not allowed to function. By providing such mode setting means, it is easy for the photographer to selectively set a photographing function in accordance with conditions and/or purpose.

It is another object of the invention to provide an image pickup apparatus in which a high-quality, long-time exposure image taking is possible without causing an increase in size/dissipation-power/cost/etc., and deterioration in image forming performance and at the same time with reducing fixed pattern noise.

In accordance with a fourth aspect of the invention, there is provided an image pickup apparatus including: a taking optical system and an image pickup device fixed immovable in relation to each other with respect to directions vertical to the optical axis of the taking optical system; image signal generation means for generating image signals based on output of the image pickup device; accumulation time control means for controlling charge accumulation time at the image pickup device; pickup image generation means for rendering a plurality of consecutive exposures by controlling the accumulation time control means and for generating one pickup image signal by adding together the obtained plurality of image signals; and motion compensation means for adding together the plurality of image signals after compensated for relative motion among the plurality of image signals in generating the pickup image signal at the pickup image generation means.

In thus constructed image pickup apparatus, a plurality of image signals are added together after compensated for relative motion among the plurality of image signals in generating the pickup image signal. Further, an ordinary imaging block is used without using a special imaging block for shifting a formed image. Hence an increase in size/ dissipation-power/cost/etc., and deterioration in image forming performance of the apparatus are not caused and furthermore a high-quality, long-time exposure image taking is possible with also reducing fixed pattern noise. The above object is thereby accomplished.

DESCRIPTION OF THE PREFERRED EMBODIMENTS

Figure 1:
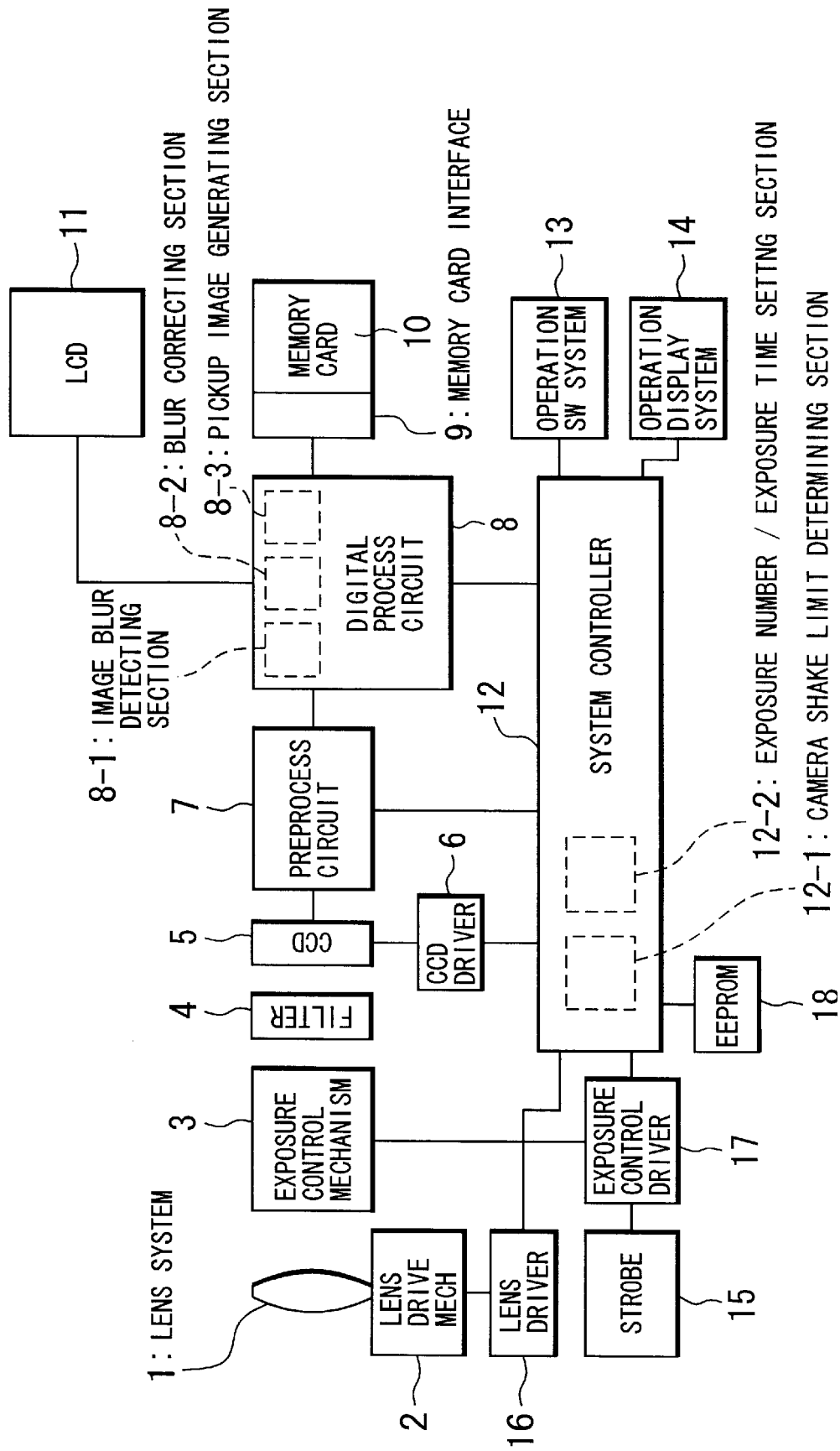
FIG. 1 is a block diagram of digital camera showing a first embodiment of the image pickup apparatus according to the present invention.

Some embodiments of the present invention will now be described. FIG. 1 is a block diagram of digital camera showing a first embodiment of the image pickup apparatus according to the invention. Included are: 1, lens system; 2, lens drive mechanism; 3, exposure control mechanism; 4, filter system; 5, CCD image pickup device; 6, CCD driver; 7, preprocess circuit including an analog-to-digital converter; 8, digital process circuit including a memory as hardware, for performing all the digital processing. Also shown are: 9, memory card interface; 10, memory card; 11, LCD image display system; 12, system controller including a microcomputer as its main component; 13, operation switch system; 14, operation display system including an indicating LCD; 15, strobe; 16, lens driver; 17, exposure control driver; 18, EEPROM.

In thus constructed digital camera, all the control is generally performed by the system controller 12 which, in particular, controls a shutter device in the exposure control mechanism 3 and drive of the CCD image pickup device 5 by the CCD driver 6 to perform exposure (charge accumulation) and readout of signals. These are stored to the digital process circuit 8 by way of the preprocess circuit 7 including an analog-to-digital converter and then, after subjected to all the necessary types of signal processing at the digital process circuit 8, are displayed on the LCD image display system 11 or recorded on the memory card 10.

The types of signal processing to be performed at the digital process circuit 8 include various processing such as the determination concerning image blur, the blur correction at the time of main image taking, the generation of long-time exposure image by addition of a plurality of image signals, etc., which are the main subject of the present invention. In particular, the digital process circuit 8 includes: an image blur detecting section 8-1 for making a determination concerning image blur by using an output information stored in the memory of the circuit; a blur correcting section 8-2 for correcting image blur when an image blur has been detected; and a pickup image generating section 8-3 for generating a long-time exposure image by means of addition of a plurality of image signals. It should be noted that the sections 8-1, 8-2, 8-3 are shown as separated from each other for ease of explanation and clarification of the concept, though these are not necessarily clearly separated from each other in actual operation processing. Note also that the digital camera according to the present embodiment is a so-called zoom camera having a variable focus.

Figure 2:
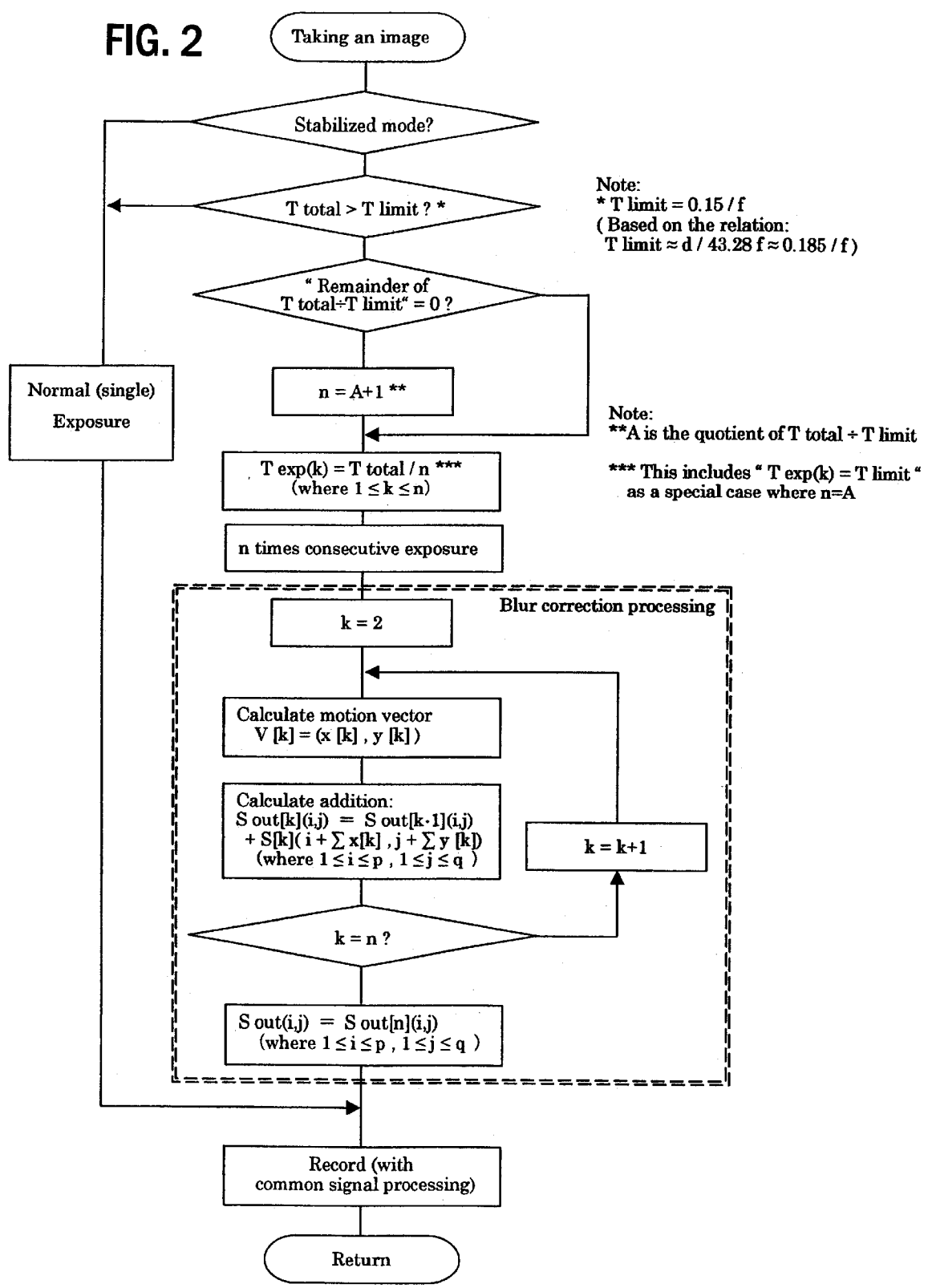
FIG. 2 is a flowchart showing a camera control according to the present invention.

A description will now be given with respect to camera control by the system controller 12 with concentrating on the type of processing that is directly related to the blur correction in the present embodiment shown also in FIG. 2. First, before taking an image, a suitable exposure time Ttotal necessary for taking the image is manually set or set on the basis of a photometry result at a known-type photometry means (such as one based on analysis of image pickup signals or one based on a separate photometric circuit (not shown)). A camera shake limit determining section 12-1 provided within the system controller 12 then determines whether or not such exposure time Ttotal is longer than a camera shake limit exposure time. Tlimit of the digital camera according to the present embodiment. Based on the result of such determination, the image taking operation of the camera is controlled. As is known, the camera shake limit exposure time is set to a threshold exposure time within which an image blur on the recorded image caused by camera shake that occurs in association with an image taking operation falls under an undetectable or allowable limit, supposing the case of the image taken with the camera being held by the hand of an average photographer.

For this reason, Tlimit in actuality can be different also based on the shape and/or weight of the camera. Anyway, the long-standing empirical laws concerning the so-called Leica-size frame (or double frame) camera, i.e., 24 mm×36 mm (43.28 mm diagonally) in respect of 35-mm film cameras is known to state "Tlimit≈1/f (sec) where f is the focal length of taking lens in millimeters". In view of the fact that the image magnification is proportional to the focal distance, the proportionality of Tlimit to 1/f can be understood theoretically, too. The present embodiment is applied based on such empirical laws with also considering the size of imaging frame which is set within the effective imaging area of the image pickup device of the digital camera. In the following description, numerical values will be merely mentioned without designation of their unit, i.e., millimeter.

In particular, the image pickup device of the digital camera according to the present embodiment uses the so-called ⅔ size having an effective imaging area of 6.6 high×8.8 wide. It has within the area an imaging frame of the so-called ½ size, height:h (=4.8)×width:w (=6.4). Such imaging frame is provided to perform blur correction which is a main object of the invention; it is variably set at a suitable position in a range so as to be contained within the total effective imaging area. Here, when generating a final pickup image by means of addition, only the pieces of data within the imaging frame are extracted and addition is performed by considering the relative address within the imaging frame as the absolute address in the finally generated image. Accordingly, the size of the frame of the generated image is equal to the size of such imaging frame and hence it is referred to as "imaging frame".

Since the range of taking object image (taking angle of view) in a camera is inversely proportional to the focal distance of the lens and is proportional to the size of the frame, the image magnification relative to the frame is proportional to the focal distance and is inversely proportional to the size of the frame. Accordingly, image blur (relative to the frame) is also inversely proportional to the size of the frame. Hence it suffices to apply what is obtained by multiplying the above described empirical law by a conversion factor corresponding to the ratio of the size of the frame. In this case, though difference in aspect ratio becomes a problem, a conversion by the diagonal is used in the digital camera according to the present embodiment.

Since the length of the diagonal of the imaging frame is d=8, Tlimit can be expressed by following formula ①:

$$\text{Tlimit} \approx d/(43.28 \times f) \approx 0.185/f \quad ①$$

In actual setting, a little margin is provided and the following expression ②, somewhat biased toward high-speed shutter, is employed.

$$\text{Tlimit} = 0.15/f \quad ②$$

It should be noted that, while, besides the diagonal conversion, it is also possible to use a conversion by height (Tlimit≈h/(24×f)≈0.2/f), a conversion by width (Tlimit≈w/(36×f)≈0.178/f), etc., the difference among these can be ignored in practice if a margin is to be provided as the above.

As is clear from the above expression ① or ②, it suffices to determine a single value as the camera shake limit exposure time Tlimit if the camera is a camera having a single focal distance. Since, however, the digital camera according to the present embodiment is a zoom camera, different values are applied correspondingly to the focal distance. In such case, it is possible either to use an operation method based on CPU operation by using the above expression ① or ② as it is or to use a look-up table in order to set a more complicated Tlimit such as by providing a threshold toward the lower-speed side with respect to the above expression ① or ② or by providing the margin without using a fixed ratio. In the case of the latter, the table data is stored in the EEPROM 18 (which may be a mask ROM). In either case, the system controller 12 recognizes focal distance information of the lens system 1 based on control information to the lens drive mechanism 2 at that moment or based on detection information of a lens position sensor (not shown) so as to obtain Tlimit by operating as the above or by looking up the table.

Using such Tlimit as a criterion, operation of the camera follows one of the following two cases of (1) and (2). It should be noted that, since operation of (1) is not different from that of a conventional camera, the following description will be of the case of (2) unless mentioned otherwise.

(1) In the case where Ttotal≦Tlimit, an exposure time Texp of the main image taking is set to Texp=Ttotal and an ordinary exposure at one time is performed to read image pickup signals. These are then suitably subjected to various signal processing and recorded on the memory card 10.

(2) In the case where Ttotal>Tlimit, the main image taking is performed as divided into a plurality (n times) of consecutive exposures. The image pickup signals obtained at respective exposures are added together by means of a known digital operation technique to form one long-time exposure image which is furthermore suitably subjected to various signal processing and is recorded on the memory card 10. At this time, the number of exposures "n" and exposure time Texp(k) for each time are set in the following manner at an exposure-number/exposure-time setting section 12-2 which is provided within the system controller 12.

n=A+1: for all values of k, Texp(k)=Ttotal/n, where A is the quotient of Ttotal÷Tlimit. If the remainder of Ttotal÷Tlimit is not zero, this setting is used.

n=A: for all values of k, Texp(k)=Tlimit, where A is the quotient of Ttotal÷Tlimit. If the remainder of Ttotal÷Tlimit is zero, this setting is used.

In other words, the necessary exposure time Ttotal is equally divided into the least number of exposures each having an exposure period less than Tlimit. Accordingly, in both the cases of (1) and (2) as described above, the exposure time in respect of the image pickup signal of each time is limited to less than the camera shake limit exposure time Tlimit.

Here, the meaning of the above "the least number", i.e., the significance of setting a longer exposure time as possible with respect to the condition of Tlimit or less is that an attempt for improving S/N is made by securing greater as possible the level of each image pickup signal within the allowable range of the limiting conditions. Although deterioration is suppressed by means of addition even if signal S/N at each time is inferior, it is impossible in actual construction to avoid an occurrence of quantizing noise due to digitization at the analog-to-digital converter. A greater signal level is desirable from this point of view, since it is difficult to suppress such quantizing noise by means of addition. Further a reduction in the number of images to be added reduces the operation load at the digital process circuit 8 and is advantageous also in that processing time is reduced. Apart from these viewpoints, "the shorter the better" is obvious for each exposure time if it is desired only to reduce the effect of camera shake on the image at each time.

Further the significance of "equally divided" in dividing into the least number of exposures as described above is to reduce the load on the processing system and more generally to secure a higher processing accuracy by equally keeping the taking conditions at each time in respect of processing such as detection of blur. Apart from this viewpoint, if only desired to divide into "the least number" of exposures, a modification of setting such as one below is also possible.

n=A+1: for k=1~n−1, Texp(k)=Tlimit: for k=n, Texp(n)=B, where A is the quotient and B is the remainder of Ttotal÷Tlimit. If B≠0, this setting is used.

n=A: for all values of k, Texp(k)=Tlimit, where A is the quotient of Ttotal÷Tlimit. If the remainder B=0, this setting is used.

The blur correction processing for the main image pickup signal performed under the restrictions as described above is as follows. In particular, motion vectors (V[k]=(x[k],y[k])), i.e., motion information among the exposures, are obtained by analyzing image pickup signals (S[k](i,j) where i,j represent coordinates of an arbitrarily selected pixel) for each exposure at the blur detecting section 8-1 by using a known motion vector detecting technique. Based on these, with shifting each imaging frame by the operation processing at the blur correcting section 8-2 so as to achieve an agreement of the object images, an addition is performed at the pickup image generating section 8-3 to generate a final pickup image Sout(i,j). Such Sout(i,j) contains a predetermined number of pixels p×q ($1 \leq i \leq p$, $1 \leq j \leq q$) corresponding to the area of the above described ½ size. In processing the addition, an interim Sout(i,j) for which addition up to "k" th exposure is complete is expressed as Sout[k](i,j). Further, at the time of first exposure (k=1), the center of the imaging frame is set at the center of the effective imaging area; for simplicity of explanation, it is supposed that coordinates of the effective imaging area are set so that S[1](i,j)=Sout[1](i,j) is achieved in this state.

(Hence negative values can also exist at some portions.)

Supposing the definition of the above motion vector V[k]=(x[k],y[k]) (in respect of a portion of the object without change in pattern) as:

$$S[k](i+x[k],j+y[k])=S[k-1](i,j) \quad (k \sim 2 \sim n) \tag{a}$$

and cumulative motion vector ΣV[k], the sum total of V[1] to V[k], as:

$$\Sigma V[k]=(\Sigma x[k], \Sigma y[k])=(x[1]+x[2]+\ldots+x[k], y[1]+y[2]+\ldots+y[k]) \tag{b}$$

the addition processing at each time can be expressed as:

$$\text{Sout}[k](i,j)=\text{Sout}[k-1](i,j)+S[k](i+\Sigma x[k], j+\Sigma y[k]), \quad (1 \leq i \leq p, 1 \leq j \leq q) \tag{c}$$

The final image to be taken is obtained by Sout(i,j)=Sout[n](i,j) and then suitably subjected to various signal processing to be recorded on the memory card 10.

The method for detecting the above described motion vector will not be described in detail, since any known technique is applicable. In an example, however, a predetermined local area is provided as a detection area with respect to the imaging frame. In respect of such detection area, a correlation evaluating value of images is computed on the basis of a supposed motion vector V[k]. For example, the sum total of absolute values of difference between the left side and the right side of the above described (a) is obtained.

$$\Sigma |S[k-1](i,j) - S[k](i+x[k], j+y[k])|$$

(Σ in this case is different from that of (b) and is a summation symbol in respect of i,j.)

Each correlation evaluating value obtained at each change in the supposition about V[k] is compared with another. It then suffices that V[k] exhibiting a minimum (corresponding to highest level of correlation: becoming "0" in the case of a total agreement) is determined as the motion vector to be obtained. Since, as previously described, each exposure time (image pickup condition) is kept equal to another, it becomes possible to obtain the motion vector by means of such a relatively simple operation processing.

Thus obtained final pickup image does not include a detectable image blur, since the exposure time of image at each time is less than the camera shake limit exposure time. A long-time exposure image without containing image blur results, since it is obtained as an addition after correcting image blur among the respective exposures by means of shift of imaging frame. If, at this time, only a center portion (such as a region of h/3×w/3) for example is set as the detection area of motion vector with an intent of aiming only at the main object, a pickup image can be obtained also as that without, in addition to image blur due to simple camera shake, an image blur in the main object (though the background is blurred) for example in a scene where the main object is moving relative to the background. By actively using this, "panning" can be achieved for example even with the camera being fixed.

Further, irrespective of setting of the detection area, this is accompanied by a secondary but great advantage of reduced fixed pattern noise. In particular, if imaging frame is shifted as a result, those pixels of the image pickup device corresponding to the same pixel of the final image are sequentially different from each other. Accordingly, such as the cumulative effect of dark charge resulting from an ordinary long-time exposure and/or an added increase of fixed pattern noise for example due to drive noise resulting from the memory addition are spatially dispersed, whereby the peak level of noise and hence highly visible noise are greatly reduced. If photographed as held by the hand, certain vibratory movements occur (and hence blur correction is necessary) no matter how securely the person intends to stabilize the camera. Noticing the noise reducing effect accompanying the blur correcting function of the digital camera according to the present embodiment, a reduction of fixed pattern noise, which has not been practical due to the necessity of a special imaging block such as a conventional shift optical system, is thereby achieved by an extremely simple construction.

It should be noted that, while the above described blur correction is performed only by means of shift (translation) of the imaging frame, it is possible to corresponds to a wider range of blur pattern by further adding rotation. In such case, however, the volume of operation is increased, since an analysis with including the rotation as a factor becomes necessary at the motion information detection means in addition to the simple motion vector detecting technique.

Various other embodiments are possible in addition to the above main embodiment. The signal level in the first embodiment becomes low due to the fact that each exposure time is 1/n of the exposure time Ttotal. Hence, in detecting this, a second embodiment is constructed so as to improve secureness of detection by setting a higher signal gain. In particular, the gain of the analog amplifier provided at a stage previous to the analog-to-digital converter of the preprocess circuit 7 is set for example to "n" times greater than the standard. In this case, "1/n" is multiplied previously to the above described addition processing (or after the addition if there is enough room in the range of the adding system). From a different point of view, such addition processing is to compute a mean value.

By noticing such point, it is also possible to enrich the above described "panning" function. This will be shown as a third embodiment. In particular, the exposure control mechanism 3 is set so that each exposure time for example is a suitable exposure time, while in the above described first embodiment Ttotal is set to the suitable exposure time. Such setting is possible even for an exposure time less than the above described Tlimit for example by using a larger aperture when the object is well-lighted. The Ttotal is then set to a time period sufficient for panning. In the addition processing, a mean value is computed similarly as in the second embodiment (with using a standard gain of the amplifier). It should be noted that, corresponding to the state of lighting, an embodiment is naturally feasible as that positioned between the second embodiment and the third embodiment.

In the first embodiment, information of pickup image at each time is used in detecting motion information and a highly accurate motion detection is thereby made possible. However, the case of reduced signal level occurs as pointed out also in the second embodiment and, if considerable, results in a possibility of erroneous operation. To prevent this, therefore, there is provided a fourth embodiment constructed as using a blur detection means which uses a known angular velocity sensor or the like. Further, a suitable embodiment is also achieved by using as the motion information detection means one for inferring motion vector at the time of taking image on the basis of information obtained as previously detecting the relative motion of the object image with respect to the imaging surface by using such as special drive of the image pickup device for improving sensitivity as one disclosed in the above cited Japanese patent application laid open No.10-336510. This is mentioned as a fifth embodiment.

In a sixth embodiment, switching is possible between the exposure operation modes, respectively making possible a long-time exposure in the digital camera according to one of the above described embodiments and a conventional long-time exposure different therefrom. The exposure operation mode of the former is referred to for example as "stabilized mode" and the exposure operation mode of the latter is referred to for example as "normal mode". It is constructed so that one of these can be designated by an input from the operation switch system 13. In particular, if the stabilized mode is selected, operation is performed of the above described embodiments according to the above classifications of (1), (2). If the normal mode is selected, the conventional camera operation corresponding to the above classification (1) is performed irrespective of the value of the suitable exposure time Ttotal. The photographer is only required to select the normal mode if afraid of an erroneous operation in the stabilized mode or if intentionally aiming at an effect of long-time shutter such as panning as that regarded as the conventional photographing technique.

While some embodiments of the present invention and modifications thereof have been specifically described, the present invention is not limited to these and naturally can take any form within the scope as set forth in its claims.

As has been described by way of the above embodiments, it is possible according to the invention to achieve an image pickup apparatus capable of obtaining images without blur even at the time of a long-time exposure. Particularly, in generating a pickup image signal, since a plurality of image signals are added together after compensated for relative motion among the plurality of image signals, a special imaging block for shifting a formed image is not required in correcting blur, and an increase in size/dissipation-power/cost/etc., and deterioration in the image forming performance of the apparatus are not caused. Further, since motion information for use in motion compensation is detected on the basis of the plurality of image signals themselves to be added together, a separate sensor is not required and an accurate blur correction is possible free from a possibility of erroneous correction even when the motion of image has been changed. In addition, a high-quality, long-time exposure image taking becomes possible with also reducing fixed pattern noise. Furthermore blur correction can be applied very simply and automatically, since blur corrected static image taking control means is provided for, if an exposure time longer than a predetermined value is set, dividing the exposure time into a plurality of exposure periods each shorter than the predetermined value and for setting each of the divided exposure periods respectively as the charge accumulation time of each of the plurality of consecutive exposures.

Since division of exposure time is achieved as equally divided into the least times of exposure satisfying predetermined conditions, the image taking S/N ratio at each time is higher and processing concerning detection of motion information becomes simpler and securer. Since a camera shake limit exposure time to be determined by the focal length of taking lens and the size of imaging frame is used as the above described predetermined value, blur correction can be applied under secure conditions backed by the long-standing empirical laws and it is always possible even with a zoom camera, etc., to obtain an image without blur under optimum conditions. Moreover, since selective setting is possible between a first image taking mode where the motion compensation means is caused to function and a second image taking mode where the same is not allowed to function, the photographer is able to set a photographing function in accordance with conditions and/or purpose. Since a plurality of image signals are added together after compensated for relative motion among the plurality of image signals in generating the pickup image signal and also since an ordinary imaging block is used without using a special imaging block for shifting a formed image, an increase in size/dissipation-power/cost/etc., and deterioration in image forming performance of the apparatus are not caused. Further a high-quality, long-time exposure image taking becomes possible with also reducing fixed pattern noise.

What is claimed is:

1. An image pickup apparatus comprising:
    an image pickup device;
    image signal generation means for generating image signals based on output of the image pickup device;
    accumulation time control means for controlling charge accumulation time at said image pickup device;
    pickup image generation means for generating one pickup image signal by adding together a plurality of image signals obtained by rendering a plurality of consecutive exposures by controlling the accumulation time control means;
    blur corrected static image taking control means for, if an exposure time longer than a predetermined value is set, dividing the exposure time into a plurality of exposure time periods each equal to or shorter than said predetermined value and for setting each of the divided exposure time periods respectively as the exposure time of each of said plurality of consecutive exposures,
    motion information detection means for detecting relative motion information among the plurality of image signals based on said plurality of image signals; and
    motion compensation means for compensating relative motion among said plurality of image signals based on the detection result at said motion information detection means,
    wherein said pickup image generation means adds together the plurality of image signals compensated for motion by said motion compensation means.

2. The image pickup apparatus according to claim 1, wherein said plurality of consecutive exposures are equally divided into the least times of exposure.

3. The image pickup apparatus according to claim 1, wherein said predetermined value is a camera shake limit exposure time to be determined by the focal length of taking lens and the size of imaging frame.

4. The image pickup apparatus according to claim 2, wherein said predetermined value is a camera shake limit exposure time to be determined by the focal length of taking lens and the size of imaging frame.

5. The image pickup apparatus according to anyone of claims 1, 2, 3, or 4, further comprising mode setting means for selectively setting to a first image taking mode where said motion compensation means is caused to function or to a second image taking mode where the same is not allowed to function.

6. An image pickup apparatus capable of obtaining image signals of a plurality of consecutive frames with respect to one image object, said image pickup apparatus comprising:
    setting means for, if an exposure time longer than a predetermined value is set, setting charge accumulation time per one frame by dividing the set exposure time into a plurality of exposure time periods each shorter than the predetermined value;
    motion information detection means for detecting relative motion information among the respective image signals each obtained in said charge accumulation time per one frame;
    operation means for operating said respective image signals so as to achieve an agreement in object images of the plurality of frames on the basis of output from said motion information detection means; and
    image generation means for generating one pickup image signal by adding together said plurality of image signals based on the result of said operation.

7. The image pickup apparatus according to claim 6, wherein said predetermined value is a camera shake limit exposure time.

8. The image pickup apparatus according to claim 6, wherein, if the exposure time is set as longer than a camera shake limit exposure time, said setting means sets the number of exposures to the quotient (a whole number) obtained by dividing said set exposure time by the camera shake limit exposure time.

9. The image pickup apparatus according to claim 7 or 8, wherein said camera shake limit exposure time is determined by the focal distance of taking lens and the size of imaging frame.

10. The image pickup apparatus according to claim 6, wherein said operation means operates said respective image signals so as to achieve an agreement of main object images of said plurality of frames by translating or rotating the images and wherein said image generation means generates an image without blur having one suitable exposure value by adding together said respective image signals.

11. An image pickup apparatus capable of obtaining image signals of a plurality of consecutive frames with respect to one image object, said image pickup apparatus comprising:
    determination means for determining whether or not a set exposure time is longer than a camera shake limit exposure time;
    setting means for, if determined as longer than the camera shake limit exposure time, setting said exposure time to a charge accumulation time by which image signals of a plurality of consecutive frames can be obtained;
    blur detection means for detecting relative amount of blur among image signals respectively for the plurality of consecutive frames obtained with respect to one image object;
    operation means for operating vectors concerning the object image between the respective image signals among said plurality of consecutive frames on the basis of said detected blur amount and for operating amount of shift and direction thereof of the respective image signals on the basis of the vectors; and
    image generation means for generating one pickup image signal by adding together the plurality of image signals based on result of said operation.

12. The image pickup apparatus according to claim 11, wherein said setting means sets the exposure time as shorter than the camera shake limit exposure time at the same time of achieving the least number of exposures.

13. The image pickup apparatus according to claim 12, wherein said camera shake limit exposure time is determined by the focal distance of taking lens and the size of imaging frame.

14. The image pickup apparatus according to claim 11, further comprising mode switch means for setting, if the exposure time set by said determination means is longer than the camera shake limit exposure time, to a first mode where image taking is performed consecutively for a plurality of times or, if the exposure time set by said determination means is shorter than the camera shake limit exposure time, to a second ordinary mode where a plurality of consecutive exposures are not performed.

* * * * *